United States Patent
McGuire et al.

(10) Patent No.: US 10,018,457 B2
(45) Date of Patent: Jul. 10, 2018

(54) ROLLER CHAIN WEAR GAUGE

(71) Applicant: Baart Industrial Group LLC, Boise, ID (US)

(72) Inventors: Andrew McGuire, Hillsboro, OR (US); Daniel McGuire, Tigard, OR (US)

(73) Assignee: BAART INDUSTRIAL GROUP LLC, Houston, TX (US)

( * ) Notice: Subject to any disclaimer, the term of this patent is extended or adjusted under 35 U.S.C. 154(b) by 162 days.

(21) Appl. No.: 15/289,685

(22) Filed: Oct. 10, 2016

(65) Prior Publication Data
US 2018/0100728 A1    Apr. 12, 2018

(51) Int. Cl.
G01B 3/34    (2006.01)
G01B 3/46    (2006.01)
G01B 3/04    (2006.01)

(52) U.S. Cl.
CPC ........ *G01B 3/46* (2013.01); *G01B 3/04* (2013.01)

(58) Field of Classification Search
CPC .......................................................... G01B 3/46
USPC ............................................... 33/555.1, 679.1
See application file for complete search history.

(56) References Cited

U.S. PATENT DOCUMENTS

| | | | |
|---|---|---|---|
| 386,469 A | 7/1888 | Howard | |
| 450,065 A | 4/1891 | Fontaine | |
| 1,424,082 A * | 7/1922 | Clopton | G01B 3/34 33/514.1 |
| 4,150,488 A | 4/1979 | Behnke | |
| 4,888,876 A | 12/1989 | Meredith et al. | |
| 4,976,042 A * | 12/1990 | Beatty | G01B 5/0002 33/536 |
| 5,199,180 A | 4/1993 | Yablonsky | |
| 5,353,513 A * | 10/1994 | Round | G01B 3/34 33/514.1 |
| 6,098,301 A * | 8/2000 | Kapphahn | G01B 3/04 33/492 |
| 6,178,824 B1 | 1/2001 | Hayakawa et al. | |
| D598,307 S | 8/2009 | Wilbur | |
| 7,654,149 B2 | 2/2010 | Wilbur | |
| 8,991,065 B1 * | 3/2015 | Schrock | F16B 9/023 33/613 |

(Continued)

OTHER PUBLICATIONS

"FB Chain Wear Gauge," accessed online at <http://www.fbchain.com/chain-wear-gauge> on Oct. 10, 2016, 2pp.

(Continued)

*Primary Examiner* — G. Bradley Bennett
(74) *Attorney, Agent, or Firm* — Brinks Gilson & Lione (57) ABSTRACT

Devices and methods for measuring roller chain wear are provided. A roller chain wear gauge may include an elongated structure configured to be inserted into a gap between two roller links of a chain joined by a pin link of the chain, the chain having an associated chain size. The elongated structure may include a first side surface, a second side surface, a length extending along a longitudinal axis of the elongated structure, and a plurality of widths located along the length and defined by and between the first and second side surfaces. The first side surface may extend at an angle relative to the longitudinal axis such that the plurality of widths continuously tapers over the length. The plurality of widths may be calibrated against a reference chain representative of the associated chain size.

20 Claims, 9 Drawing Sheets

(56) References Cited

U.S. PATENT DOCUMENTS

2009/0307919 A1* 12/2009 Lee .................. G01B 3/42
33/679.1
2015/0040415 A1* 2/2015 Hoebel .............. G01B 3/46
33/701

OTHER PUBLICATIONS

"Chain Wear Indicator," accessed online at <http://www.parktool.com/product/chain-wear-indicator-cc-3-2> on Oct. 10, 2016, 2pp.
"Standard Chain Wear Guide," accessed online at <http://www.renold.com/products/sprockets-and-accessories/chain-wear-guide/standard/> on Oct. 10, 2016, 3pp.

* cited by examiner

ROLLER CHAIN WEAR GAUGE

BACKGROUND

Technical Field

The present disclosure is generally related to the field of wear gauges for chains, and more specifically is related to the field of wear and elongation gauges for roller chains.

Background Information

Roller chains are generally chains formed from a series of alternately assembled pin links and roller links, and may be used to transfer force from one rotating object to another rotating object. For example, a bike may include a roller chain connecting two sprockets of the bike, so that force generated by pushing on pedals of the bike can be transferred by the roller chain from a sprocket on an axle attached to the pedals to a sprocket on an axle attached to a wheel of the bike.

Figure 1A:
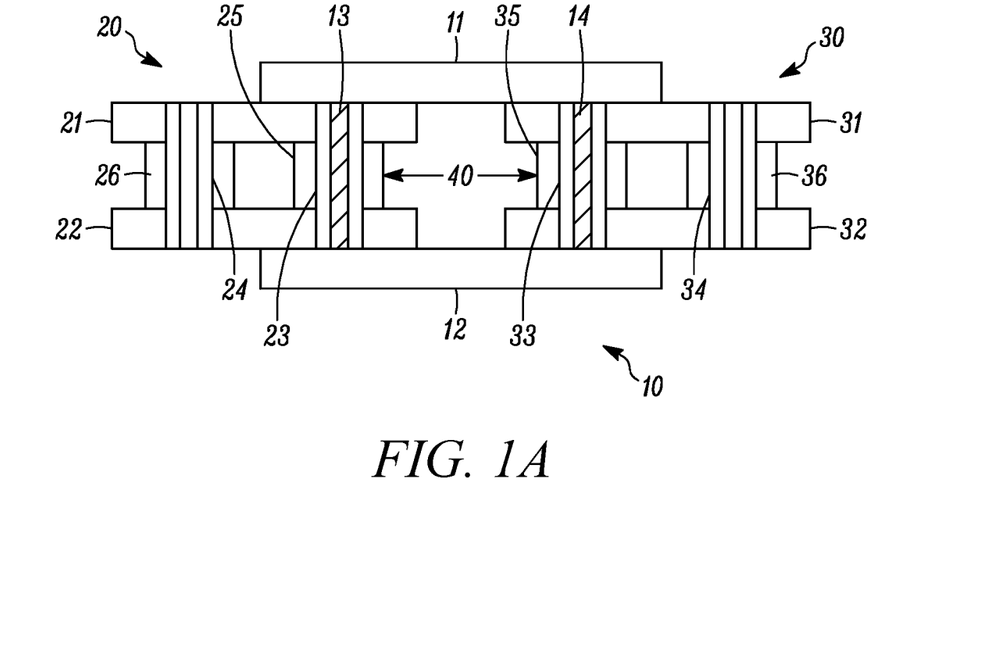
FIG. 1A is a side view in cross-section of a section of an exemplary roller chain in a new condition.
Figure 1B:
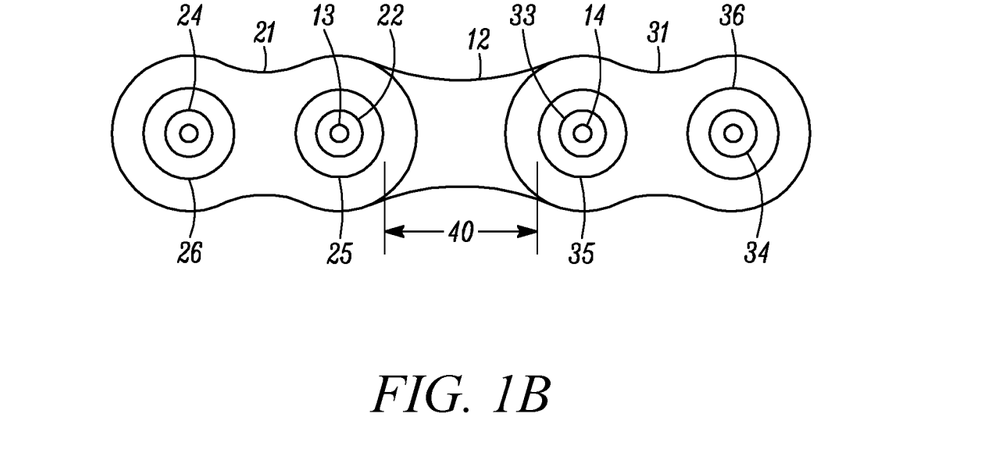
FIG. 1B is a partial cutaway top view of the section of the exemplary roller chain in the new condition.

As background, a section of an exemplary roller chain when new and under tension is illustrated in FIGS. 1A and 1B. In FIG. 1B pin link plate 11, roller link plate 21, and roller link plate 31 are removed for illustrative purposes. The section of exemplary roller chain includes a pin link 10, a first roller link 20, and a second roller link 30.

Pin link 10 includes two pin link plates 11 and 12 that are fit together with two pins 13 and 14. Pins 13 and 14 separate pin link plate 11 from pin link plate 12. Pins 13 and 14 do not turn relative to pin link plates 11 and 12.

First roller link 20 includes two roller link plates 21 and 22 that are fit together with two bushings 23 and 24 and two rollers 25 and 26. Bushings 23 and 24 and rollers 25 and 26 separate roller link plate 21 from roller link plate 22. Each bushing 23 and 24 is located within a respective roller 25 and 26, and does not turn relative to roller link plates 21 and 22. Rollers 25 and 26 can turn on their respective bushings 23 and 24.

Second roller link 30 includes two roller link plates 31 and 32 that are fit together with two bushings 33 and 34 and two rollers 35 and 36. Bushings 33 and 34 and rollers 35 and 36 separate roller link plate 31 from roller link plate 32. Each bushing 33 and 34 is located within a respective roller 35 and 36, and does not turn relative to roller link plates 31 and 32. Rollers 35 and 36 can turn on their respective bushings 33 and 34.

During assembly of the section of roller chain, pin 13 of pin link 10 is inserted into bushing 23 of first roller link 20, while the other pin 14 of pin link 10 is inserted into bushing 33 of second roller link 30. In the assembled section of roller chain, pin link plate 11 sits outside of roller link plates 21 and 31, and pin link plate 12 sits outside of roller link plates 22 and 32. Pins 13 and 14 can respectively articulate inside bushings 23 and 33. Rollers 25 and 35 can respectively turn on their bushings 23 and 33. A gap 40 is defined by and between roller 25 and roller 35.

In the complete chain (not shown), a pin of a second pin link (not shown) is inserted into roller 26 of roller link 20, and a pin of a third pin link (not shown) is inserted into roller 36 of roller link 30, additional roller links are joined to those second and third pin links, and so on, to produce the chain.

During use of a roller chain, a tooth of a sprocket may enter a gap of a chain section so that force can be transmitted between the chain and the sprocket, causing the chain to move relative to the sprocket. Associated movements of the individual joints in the roller chain cause friction between pins and their respective bushings. That friction can cause material from the bushings and/or pins to wear away, thus causing pins to fit less tightly within their respective bushings. When the worn chain is placed under tension, it will be elongated relative to its condition when new.

Figure 2A:
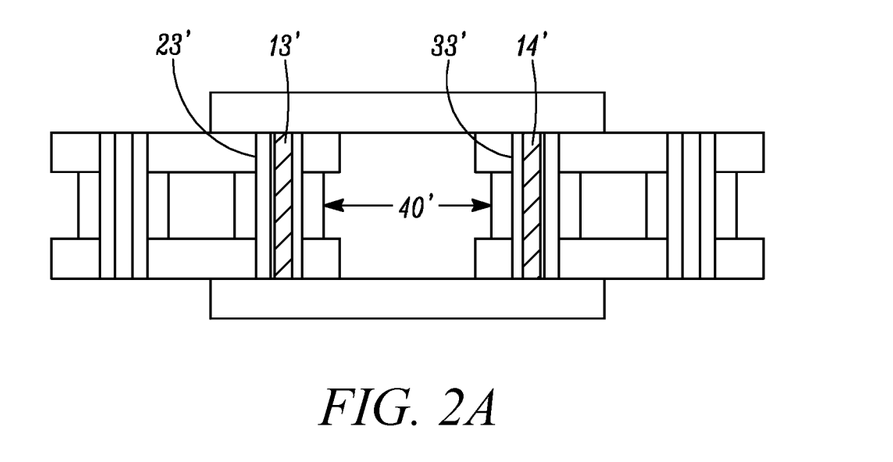
FIG. 2A is a side view in cross-section of a section of an exemplary roller chain in a worn condition.
Figure 2B:
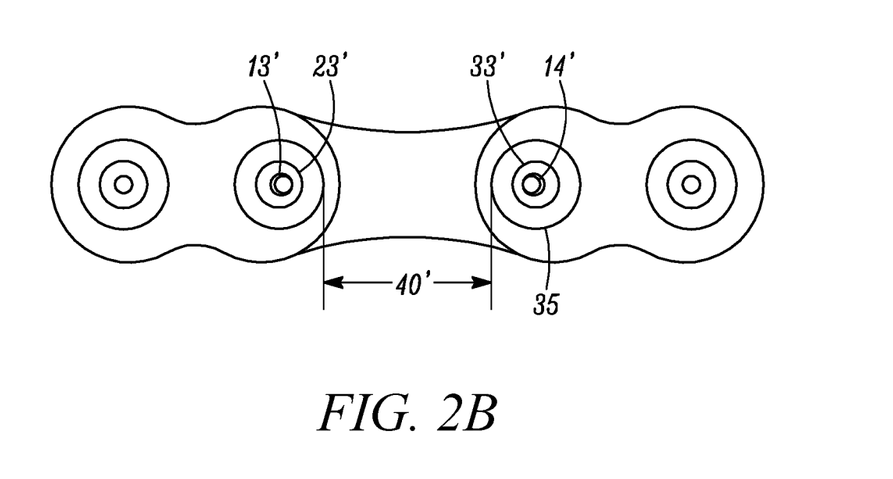
FIG. 2B is a partial cutaway top view of the section of the exemplary roller chain in the worn condition.

FIGS. 2A and 2B illustrate the section of exemplary roller chain in a worn condition and under tension. In FIG. 2B pin link plate 11, roller link plate 21, and roller link plate 31 are removed for illustrative purposes. Pins 13' and 14' represent pins 13 and 14 after having been worn, and bushings 23' and 33' represent bushings 23 and 33 after having been worn. Wear has reduced how tightly pin 13' fits within bushing 23', and how tightly pin 14' fits within bushing 33'. The distance between rollers 25 and 26 of roller link 20 does not change due to the wear; nor does the distance between rollers 35 and 36 of roller link 30. However, when the worn roller chain is under tension, because pin 13' fits more loosely in bushing 23', and pin 14' fits more loosely in bushing 33', the rollers 25 and 35 sit farther apart from each other than they did when the chain was new. Thus in the worn state, gap 40' between the rollers 25 and 35 of the section of roller chain is wider than gap 40, and the chain is elongated relative to its condition when new.

Chain wear and elongation can lead a chain to ride poorly on sprockets, and can eventually cause a variety of problems, such as noise, vibration, increased wear on sprocket teeth, chain breakage, etc. Thus a chain should be replaced when it has elongated a certain amount compared to its length when it was new. Allowable amounts of elongation for a chain of a given size vary depending on how the chain is being used. For example, in many uses, chains should be replaced at 3% elongation. In other uses, chains should be replaced at 1.5% elongation. These are merely examples of allowable amounts of elongation, and other amounts of elongation may be allowable for other uses.

Roller chains can be made in a variety of different standardized chain sizes. For example, the American National Standards Institute (ANSI) specifies various standard chain sizes, in which the first digit(s) indicate the pitch of the chain in eighths of an inch, and the last digit indicates a chain type (e.g. standard or lightweight). Some exemplary ANSI roller chain sizes include Nos. 25, 35, 40, 50, 60, 80, 100, 120, 140, 160, 180, 200, and 240. Other standardized chain sizes, such as metric chain sizes, also exist.

BRIEF SUMMARY

The amount of allowable elongation of a roller chain of a given size can vary depending on how the roller chain is being used. Additionally, regardless of whether a roller chain currently needs to be replaced due to wear, it may be beneficial for a user to know how much wear a roller chain has already sustained, or how much more wear the roller chain can tolerate before it does need to be replaced. Thus a roller chain wear gauge that merely provides a binary indication of whether or not a roller chain of a given size has reached a single threshold amount of elongation may be of limited use. It is desirable to develop a roller chain wear gauge that can be used to measure or indicate a plurality of different chain wear conditions of a roller chain of a given chain size. The present disclosure provides devices and methods to measure or indicate a plurality of different chain wear conditions of a roller chain of a given size.

According to a first aspect of the disclosure, a device to measure chain wear is provided. The device may include an elongated structure configured to be inserted into a gap between two roller links of a chain joined by a pin link of the chain, the chain having an associated chain size. The elongated structure may include a first side surface, a second side surface, a length extending along a longitudinal axis of the elongated structure, and a plurality of widths located along the length and defined by and between the first and second side surfaces. The first side surface may extend at an angle relative to the longitudinal axis such that the plurality of widths continuously tapers over the length. The plurality of widths may include a first width calibrated to correspond to a gap between two links of a reference chain with a first amount of elongation and a second width calibrated to correspond to a gap between the two links of the reference chain with a second amount of elongation. The reference chain may be representative of the associated chain size and the two links of the reference chain may be two roller links of the reference chain joined by a pin link of the reference chain.

According to a second aspect of the disclosure, a device to measure chain wear is provided. The device may include an elongated structure configured to be inserted into a gap between two roller links of a chain joined by a pin link of the chain, the chain having an associated chain size. The elongated structure may include a first side surface, a second side surface, a length extending along a longitudinal axis of the elongated structure, a plurality of widths located along the length and defined by and between the first and second side surfaces, and a plurality of markings each located at a different respective longitudinal position along the length. The plurality of widths may include a first width calibrated to substantially equal a width of a gap between two links of a reference chain with a first amount of elongation and a second width different from the first width and calibrated to substantially equal a width of a gap between the two links of the reference chain with a second amount of elongation. The reference chain may be representative of the associated chain size, and the two links of the reference chain may be two roller links of the reference chain joined by a pin link of the reference chain. The respective longitudinal position of each of the plurality of markings may be calibrated based upon the reference chain to correspond to a different respective chain wear condition of the associated chain size.

According to a third aspect of the disclosure, a method of measuring chain wear is provided. The method may include inserting an elongated structure to an insertion depth into a gap between a first roller link of a first chain joined to a second roller link of the first chain by a pin link of the first chain. The elongated structure may include a first side surface, a second side surface, a length extending along a longitudinal axis of the elongated structure, and a plurality of widths located along the length and defined by and between the first and second side surfaces. The first side surface may extend at an angle relative to the longitudinal axis such that the plurality of widths continuously tapers over the length. At the insertion depth the first side surface may contact a roller of the first roller link of the first chain while the second side surface contacts a roller of the second roller link of the first chain. The method may further include determining a chain wear condition of the first chain by determining a longitudinal position of the first chain along the length of the elongated structure when the first chain is inserted to the insertion depth.

Aspects of the disclosure may provide a variety of advantages, some examples of which include the following. Aspects of the disclosure may allow a user to tension a roller chain and measure chain wear or elongation using a single hand. Aspects of the disclosure may allow the user to read a gradient of amounts of elongation or wear statuses. Aspects of the disclosure may allow a user to quickly check wear or elongation at one or more spots on a given chain. Aspects of the disclosure may allow a user to determine how soon a roller chain that is in new or good condition will need to be replaced.

Other devices, methods, features, and advantages of the disclosure may be or become apparent to one skilled in the art upon examination of the following drawings and detailed description. It is intended that all such additional devices, methods, features, and advantages be within the scope of the disclosure.

DETAILED DESCRIPTION OF THE DRAWINGS

In the following description, reference is made to the accompanying drawings, which form a part of the description, and which show illustrative aspects consistent with this disclosure. Other aspects not expressly shown or discussed herein may be apparent to one skilled in the art upon examination of this disclosure, and may be implemented without departing from the scope of this disclosure.

The amount of allowable elongation of a roller chain of a given size can vary depending on how the roller chain is being used. Additionally, regardless of whether a roller chain currently needs to be replaced due to wear, it may be beneficial for a user to know how much wear a roller chain has already sustained, or how much more wear the roller chain can tolerate before it does need to be replaced. Roller chain wear gauges are described, which can be used to measure or indicate a plurality of different chain wear conditions of a roller chain of a given chain size. The described roller chain wear gauges include a portion that tapers in width to allow for insertion between two roller links that are joined by a pin link.

Figure 3:
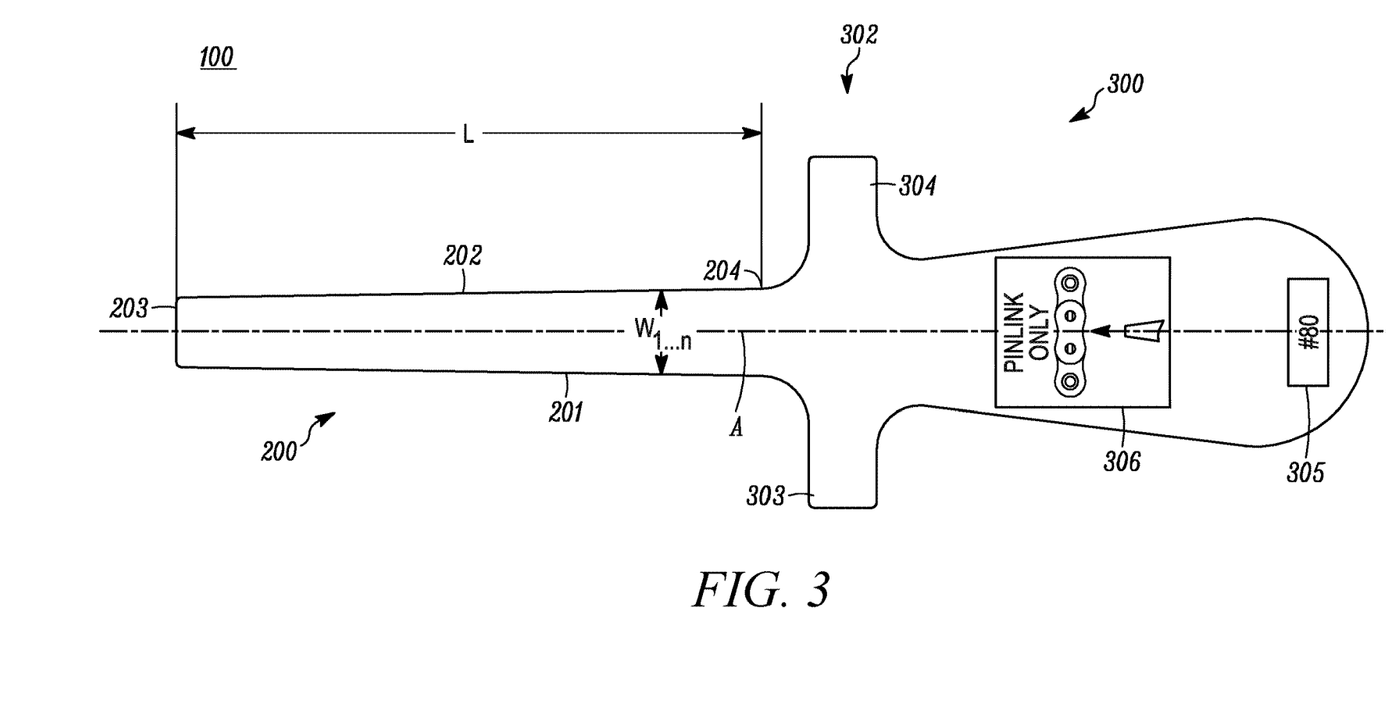
FIG. 3 is a top view of a roller chain wear gauge.

FIG. 3 is a top view of an exemplary roller chain wear gauge 100. Roller chain wear gauge 100 generally includes an elongated structure 200 coupled with a handle 300. Elongated structure 200 is generally configured to be used as a probe to measure roller chain wear, as will be described in further detail below. Handle 300 is generally configured to allow the user to hold roller chain wear gauge 100 and manipulate elongated structure 200.

Elongated structure 200 includes a first side surface 201, a second side surface 202, a distal end 203, and a proximal end 204. A length L of elongated structure 200 extends along a longitudinal axis A of elongated structure 200 from distal end 203 to proximal end 204.

In some implementations, first side surface 201 and second side surface 202 each extend at an angle relative to longitudinal axis A. In some implementations, first side surface 201 and second side surface 202 are positioned symmetrically about the longitudinal axis A with respect to each other. However, in other implementations such as those described below in conjunction with FIG. 7, only one of first side surface 201 or second side surface 202 extend at an angle relative to longitudinal axis A.

As will be discussed in further detail below, elongated structure 200 is generally configured to be used as a probe to measure chain wear of a roller chain based upon how far elongated structure 200 can be inserted into a gap between two roller links that are joined by a pin link. For example, as shown in FIGS. 4A, 4B, 5A and 5B, distal end 203 of elongated structure 200 can be inserted into gap 40 or 40' until first side surface 201 contacts roller 25 of roller link 20 and second side surface 202 contacts roller 35 of roller link 30. Insertion of elongated structure 200 then stops, and the width of elongated structure 200 where elongated structure 200 is contacting rollers 25 and 35 corresponds to the width of gap 40 or 40'. The width of gap 40 or 40' corresponds to the amount of chain wear of the measured chain, and thus the width of the elongated structure 200 where it contacts rollers 25 and 35 can be used to determine the amount of chain wear of the chain, as is discussed in further detail below.

Figure 6:
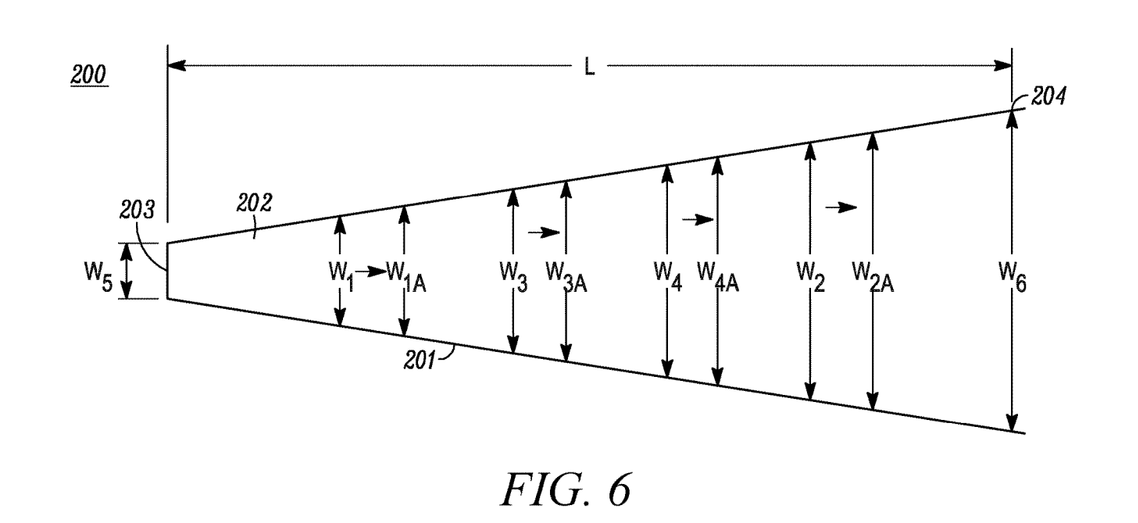
FIG. 6 is a top view of an elongated structure of a roller chain wear gauge.

As shown in FIG. 6, elongated structure 200 includes a plurality of different widths $w_{1 \ldots n}$ defined by and between first side surface 201 and second side surface 202. The plurality of widths $w_{1 \ldots n}$ extends along length L from distal end 203 to proximal end 204. The plurality of widths $w_{1 \ldots n}$ includes first width $w_1$, second width $w_2$, third width $w_3$, fourth width $w_4$, fifth width $w_5$, and sixth width $w_6$. The plurality of widths $w_{1 \ldots n}$ decreases from $w_6$ at proximal end 204 to $w_5$ at distal end 203. In other words, elongated structure 200 tapers between first side surface 201 and second side surface 202, from sixth width $w_6$ at proximal end 204 to fifth width $w_5$ at distal end 203. In FIG. 6, the taper is continuous and smooth from proximal end 204 to distal end 203. However, implementations in which the taper is not continuous or smooth may be apparent to one skilled in the art.

To create an elongated structure 200 for use with a particular chain size, at least some widths included in the plurality of widths $w_{1 \ldots n}$ of elongated structure 200 are selected based upon characteristics of a reference chain (not shown) representative of that particular chain size.

A first type of reference chain representative of a particular chain size (e.g. No. 80) may be a particular physical roller chain (e.g. chain A) of the particular chain size, which has been used until it wears to a plurality of particular amounts of elongation (e.g. 0%, 1%, 2%, and 3% elongation from new). The reference chain may be structurally similar to the roller chain illustrated in FIG. 1, and have a first reference roller link and a second reference roller link joined by a reference pin link. As the reference chain is worn to each particular amount of elongation, the respective widths of the respective gaps between the first and second roller links at those times can be measured and recorded.

A second type of reference chain representative of a particular chain size may be a model of a roller chain that is representative of a particular chain size. The model may be determined by performing the steps described above in connection with the first type of reference chain for each of a plurality of physical roller chains of the particular chain size (e.g. three No. 80 chains: chain A, chain B, and chain C), and determining and recording a respective average gap width from among the plurality of chains for each particular amount of elongation. For example, the gap width of chain A when it has elongated 3%, the gap width of chain B when it has elongated 3%, and the gap width of chain C when it has elongated 3% may be measured and averaged together, with that average being recorded as the 3% gap width for the reference chain model. The above types of reference chains are merely exemplary, and other types of reference chains consistent with this disclosure may be apparent to one skilled in the art.

Widths to include in the plurality of widths $w_{1 \ldots n}$ of the elongated structure 200 may then be selected to correspond to respective widths of different respective gaps between the first and second reference roller links when the reference chain has elongated different respective amounts. For example: $w_{1 \ldots n}$ may be selected to substantially equal a width of a gap between the reference roller links of the reference chain when the reference chain has elongated 0%; $w_2$ may be selected to substantially equal a width of a gap between the reference roller links of the reference chain when the reference chain has elongated X; $w_3$ may be selected to substantially equal a width of a gap between the reference roller links of the reference chain when the reference chain has elongated Y; and $w_4$ may be selected to substantially equal a width of a gap between the reference roller links of the reference chain when the reference chain has elongated Z. The term "substantially equal" allows for reasonable differences such as manufacturing and measurement tolerances recognized in the art. Width $w_5$ of elongated structure 200 may be selected to be sufficiently small so that distal end 203 can be inserted into the gap (e.g. 40) between rollers (e.g. 25 and 35) of a new condition roller chain having a chain size that the elongated structure 200 is configured to measure.

In one exemplary implementation, X is 3%, Y is 1%, and Z is 2%. In another exemplary implementation, X is 1.5%, Y is 0.5%, and Z is 1%. These exemplary elongation amounts may be elongations with respect to when the reference chain was in a new condition. In some implementations, a width for 0% elongation may be omitted. One skilled in the art will recognize that these particular amounts of elongation are merely exemplary, and that other amounts of elongation of the reference chain may be used for selecting widths in the plurality of widths $w_{1 \ldots n}$.

The width in the plurality of widths $w_{1 \ldots n}$ of elongated structure 200 that corresponds to the width of the gap (e.g. 40 or 40') between the rollers (e.g. 25 and 35) of a chain being measured can thus be used to determine the elongation of a measured roller chain of a particular size, because widths (e.g. $w_1$, $w_2$, $w_3$, and $w_4$) in the plurality of widths $w_{1 \ldots n}$ have been calibrated to correspond to widths of gaps between reference rollers of a reference roller chain of the particular size at various amounts of elongation. As will be discussed further below with reference to FIGS. 8 and 9, a plurality of markings may be included with the elongated structure 200 and associated with the plurality of widths $w_{1...n}$ so the user can read chain wear conditions from roller chain wear gauge 100.

Figure 4A:
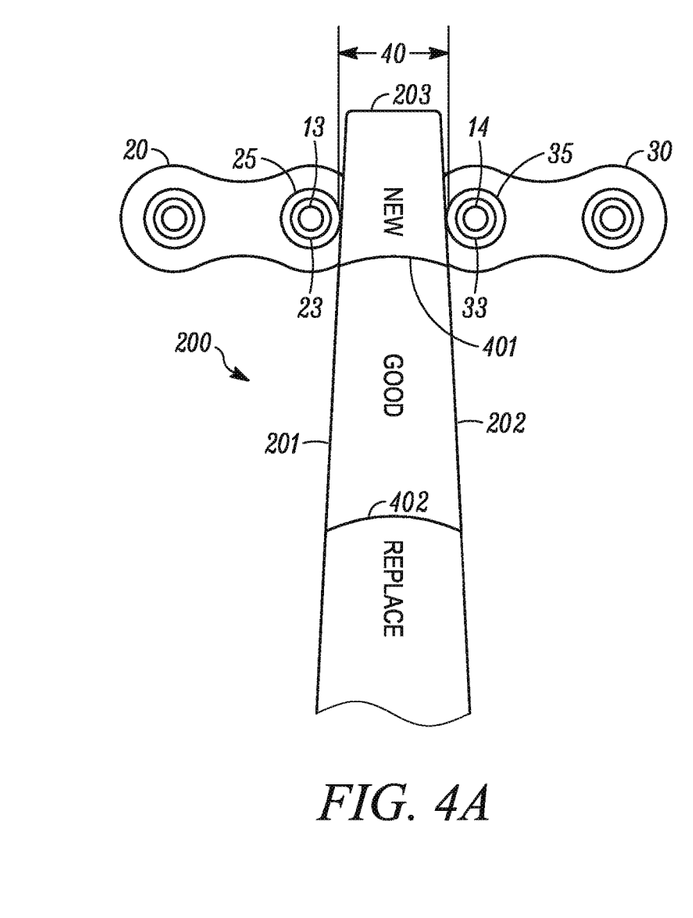
FIG. 4A is a partial cutaway top view of a roller chain wear gauge inserted into a new roller chain.
Figure 4B:
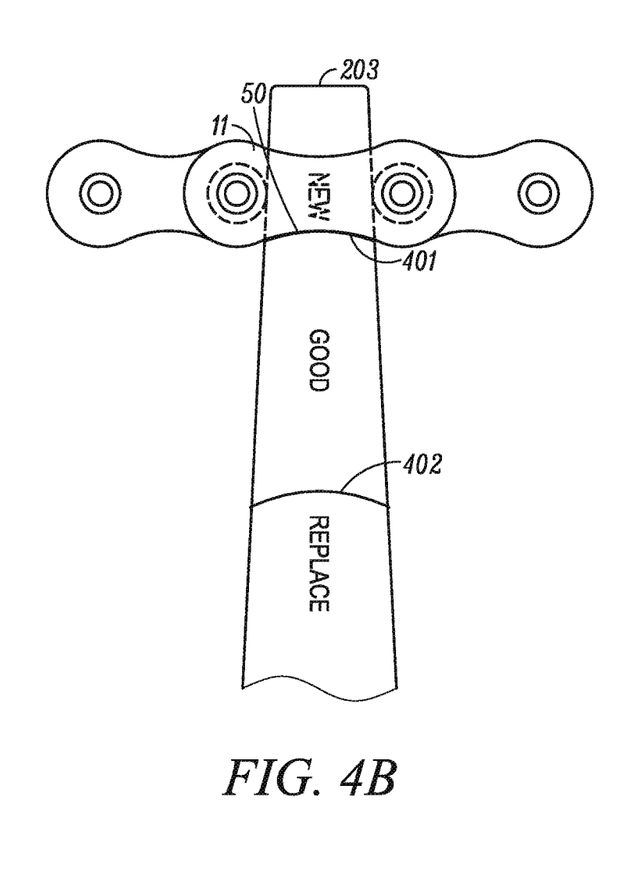
FIG. 4B is a top view of the roller chain wear gauge inserted into the new roller chain.
Figure 5A:
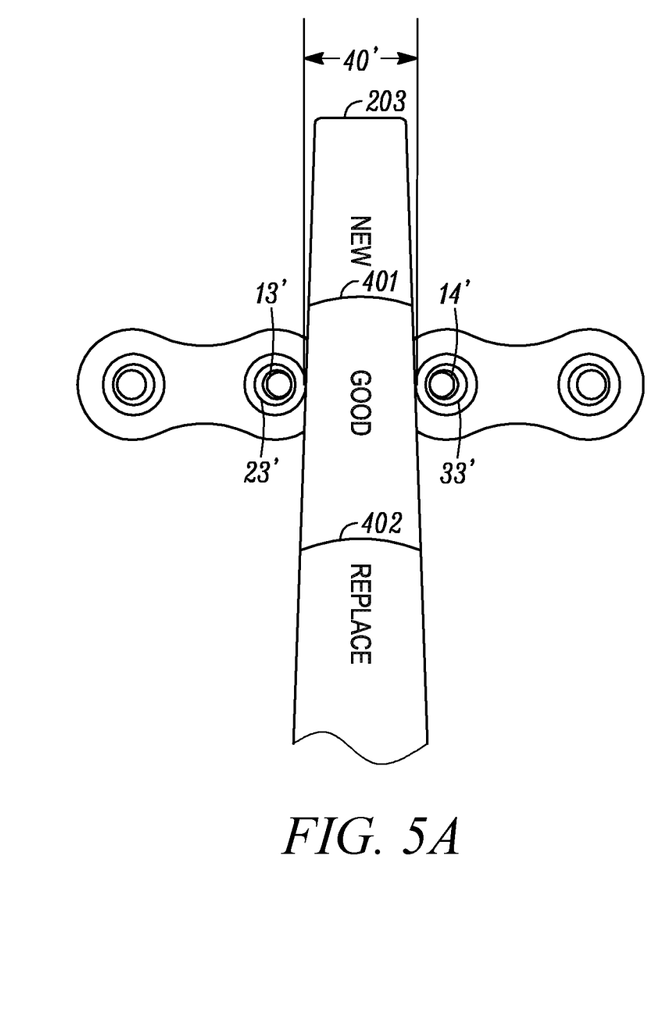
FIG. 5A is a partial cutaway top view of the roller chain wear gauge inserted into a worn roller chain.
Figure 5B:
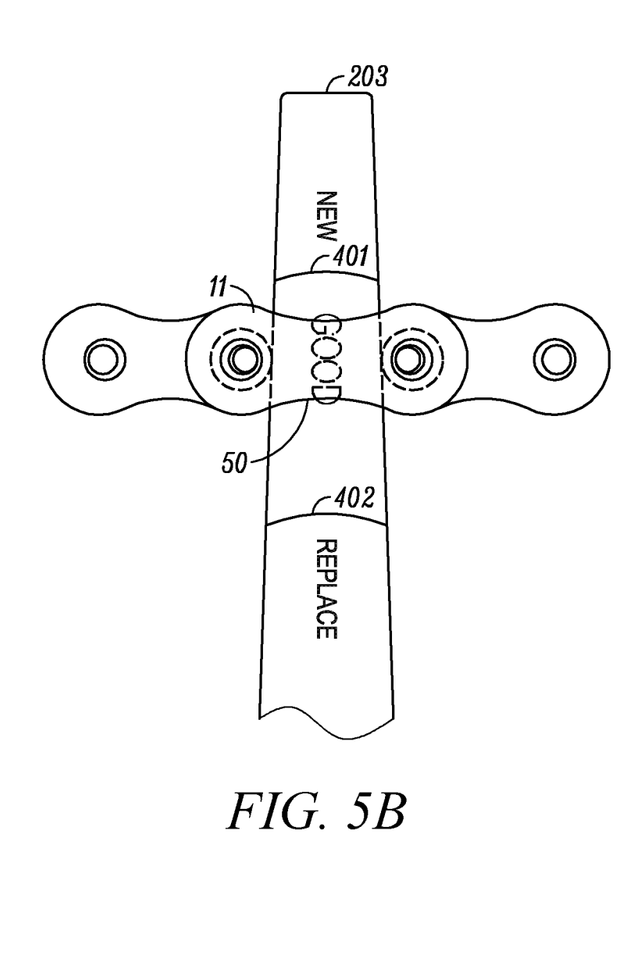
FIG. 5B is a top view of the roller chain wear gauge inserted into the worn roller chain.

As shown in FIGS. 4B and 5B, when elongated structure 200 is inserted into the chain to measure chain wear, pin link plates (e.g. pin link plates 11 and 12) may cover the portion of elongated structure 200 having the width that substantially equals the width of the gap between the rollers (e.g. rollers 25 and 35). So that the user can more easily read chain wear conditions from roller chain wear gauge 100, instead of placing markings at those substantially equal widths (e.g. at $w_1$, $w_2$, $w_3$, and $w_4$), markings may be placed at widths in the plurality of widths $w_{1...n}$ that are associated with the substantially equal widths. For example, as shown in FIG. 6, first associated width $w_{1a}$ is offset proximally from $w_1$. The distance of the offset is a sufficient distance such that $w_{1a}$ is located on the portion of elongated structure 200 that would extend just proximally to the proximal edge of the pin link plates when $w_1$ is located at the gap between rollers, such that $w_{1a}$ would be visible to the user. For example, $w_{1a}$ could be located on the portion of elongated structure 200 that would extend just proximally to the proximal edge 50 of pin link 11 when first width $w_1$ is located in gap 40'. Similar associated widths may be determined for other widths in the plurality of widths $w_{1...n}$. For example: $w_2$ has a second associated width $w_{2a}$; $w_3$ has a third associated width $w_{3a}$; and $w_4$ has a fourth associated width $w_{4a}$.

The length L of elongated structure 200 is generally selected so that a pin link plate of a roller chain of a particular chain size can be pushed onto elongated structure 200 along longitudinal axis A to a plurality of different longitudinal positions on elongated structure 200, as shown for example in FIGS. 4A, 4B, 5A, and 5B, so that a plurality of chain wear conditions of a roller chain of the particular size can be measured and indicated.

Elongated structure 200 may be formed to include length L and the selected plurality of widths $w_{1...n}$ using any suitable technique. For example, elongated structure 200 may be plasma cut from a flat sheet of metal to include first side surface 201, second side surface 202, and distal end 203, with the selected plurality of widths $w_{1...n}$ between and defined by first side surface 201 and second side surface 202. Roller chain wear gauge 100, including elongated structure 200 and handle 300 may be plasma cut from a single flat sheet of metal. Other methods of and materials for making roller chain wear gauge 100 may be apparent to one skilled in the art. For example, elongated structure 200 could be formed by grinding a taper, molding a taper, etc. Roller chain wear gauge 100 could be made from more than one piece of material or more than one type of material.

Figure 7:
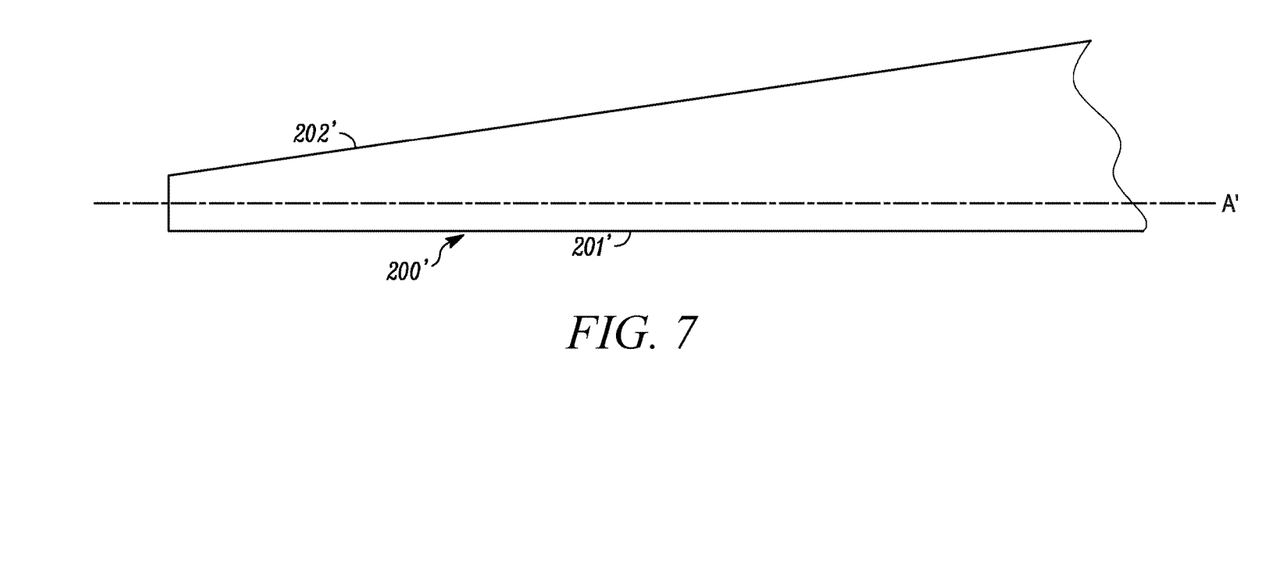
FIG. 7 is a top view of an elongated structure of a roller chain wear gauge.

FIG. 7 illustrates an alternative elongated structure 200' in which first side surface 201' is parallel to the longitudinal axis A', and second side surface 202' is angled relative to the longitudinal axis A'. Elongated structure 200' illustrates another suitable probe configuration that includes a plurality of different widths defined between opposite sides (201' and 202') of the probe. Elongated structure 200' could otherwise include similar features as elongated structure 200, be used in a similar manner, and be attached to a similar handle 300.

Figure 8:
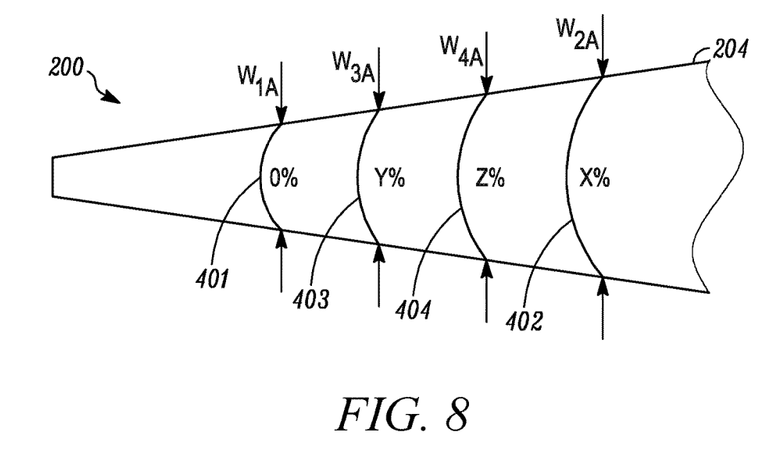
FIG. 8 is a top view of an elongated structure of a roller chain wear gauge.

FIG. 8 illustrates a top view of elongated structure 200 including a plurality of marks 401-404 located at different respective longitudinal positions along the length L. Each of marks 401-404 is configured to indicate to the user an amount of elongation of a measured roller chain of a particular chain size. First mark 401 is located at $w_{1a}$. Second mark 402 is located at $w_{2a}$. Third mark 403 is located at $w_{3a}$. Fourth mark 404 is located at $w_{4a}$. Each of marks 401-404 represents a respective amount of elongation of the particular chain size.

FIG. 8 illustrates each of marks 401-404 as respectively representing a specific percentage of elongation: "0%," "X %," "Y %," and "Z %." Marks 401-404 may however represent other units of elongation. In FIG. 8, marks 401-404 each include a curved line extending from first side surface 201 to second side surface 202, along with an associated textual representation of an amount of elongation. In FIG. 8, each curved line opens toward the proximal end 204 and has a shape that corresponds to a shape of proximal edge of a pin link plate (e.g. proximal edge 50 of pin link plate 11) when the curved line and pin link plate are viewed in top view. The curved shape of the lines of marks 401-404 thus allows a user to more easily read an amount of elongation based upon the proximal edge of the pin link plate. Marks consistent with this disclosure are not however limited to the forms illustrated in FIG. 8, and other implementations will be apparent to one skilled in the art.

Marks 401-404 may be formed on or in elongated structure 200 in any suitable manner that will be perceptible to a user, including etching, molding, drawing, etc. Marks 401-404 may be in any suitable language or may omit textual representations altogether. Marks 401-404 may be symbols or patterns indicating different amounts of elongation to a user. Although FIG. 8 illustrates four marks 401-404, less or more marks may be included consistent with this disclosure. Although FIG. 8 illustrates marks at associated widths $w_{1a}$, $w_{2a}$, $w_{3a}$, and $w_{4a}$, marks could be included at other widths of the plurality of widths $w_{1...n}$.

Figure 9:
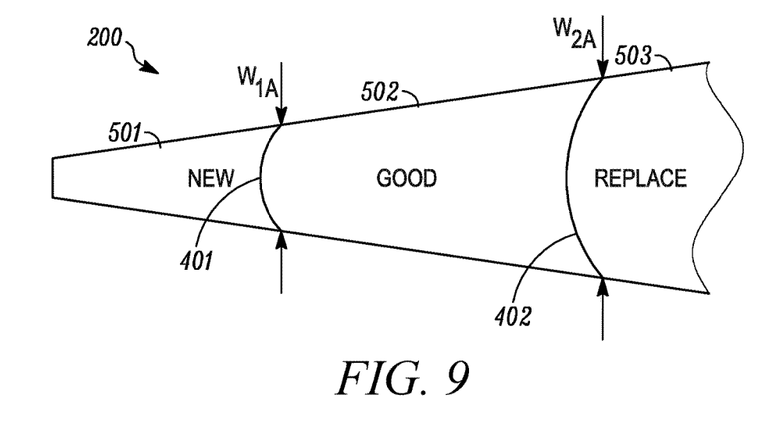
FIG. 9 is a top view of an elongated structure of a roller chain wear gauge.

FIG. 9 illustrates a top view of elongated structure 200 including a plurality of markings, including marks 401 and 402 (with associated textual representations omitted) and a plurality of indicators 501-503. Each of the plurality of markings is located at a different respective longitudinal position along the length L. Marks 401 and 402 divide elongated structure 200 into consecutive first, second, and third longitudinal sections, each representing a different respective range of amounts of elongation for a chain of a particular size. Indicator 501 is located in the first longitudinal section, which represents less than 0% elongation. Indicator 502 is located in the second longitudinal section, which represents greater than 0% to less than X % elongation. Indicator 503 is located in the third longitudinal section, which represents greater than X % elongation.

Indicators 501-503 are each configured to indicate different respective chain wear statuses for a particular chain size. Indicator 501 is located in the first longitudinal section, between distal end 203 and mark 401, and is configured to indicate that the measured roller chain is of a new wear status. Indicator 502 is located in the second longitudinal section, between mark 401 and mark 402, and is configured to indicate that the measured roller chain is of a good wear status. Indicator 503 is located, in the third longitudinal section, proximal to mark 402, and is configured to indicate that the measured roller chain is of such a wear status that the chain should be replaced. In FIG. 9, indicator 501 is illustrated as the text "NEW," indicator 502 is illustrated as the text "GOOD," and indicator 503 is illustrated as the text "REPLACE." Indicators consistent with this disclosure are not however limited to the forms illustrated in FIG. 9, and other implementations will be apparent to one skilled in the art.

Indicators 501-503 could be in any suitable form or language. Indicators 501-503 could omit text altogether. Indicators 501-503 could be symbols or patterns indicating different chain wear statuses to a user. Indicators 501-503 may be formed on or in elongated structure 200 in any suitable manner that will be perceptible to a user, including etching, molding, drawing, etc. Although FIG. 9 illustrates three longitudinal sections and wear status indicators, less or more may be included consistent with this disclosure. Although FIG. 9 illustrates indicators 501-503 as being separated from each other by marks 401 and 402, marks separating indicators may be located at widths other than $w_{1a}$ and $w_{2a}$, or could be omitted altogether.

An implementation (not shown) of elongated structure 200 may include all of marks 401-404 (including textual representations of elongation) along with all of indicators 501-503.

The particular respective longitudinal positions of markings, such as marks 401-404 and indicators 501-503, can vary depending upon the uses of the roller chains on which the roller chain wear gauge is intended to measure wear. For example, for roller chains used in a manner requiring that they be replaced at 1.5% elongation rather than at 3% elongation, second width $w_2$ can be selected to substantially equal the width of the gap between the rollers of the reference chain when the reference chain has elongated 1.5%. Second associated width $w_{2a}$ can be selected to be offset from second width $w_2$, and the "REPLACE" indicator can be included on a portion of elongated structure 200 that is located proximal to $w_{2a}$.

Figure 10:
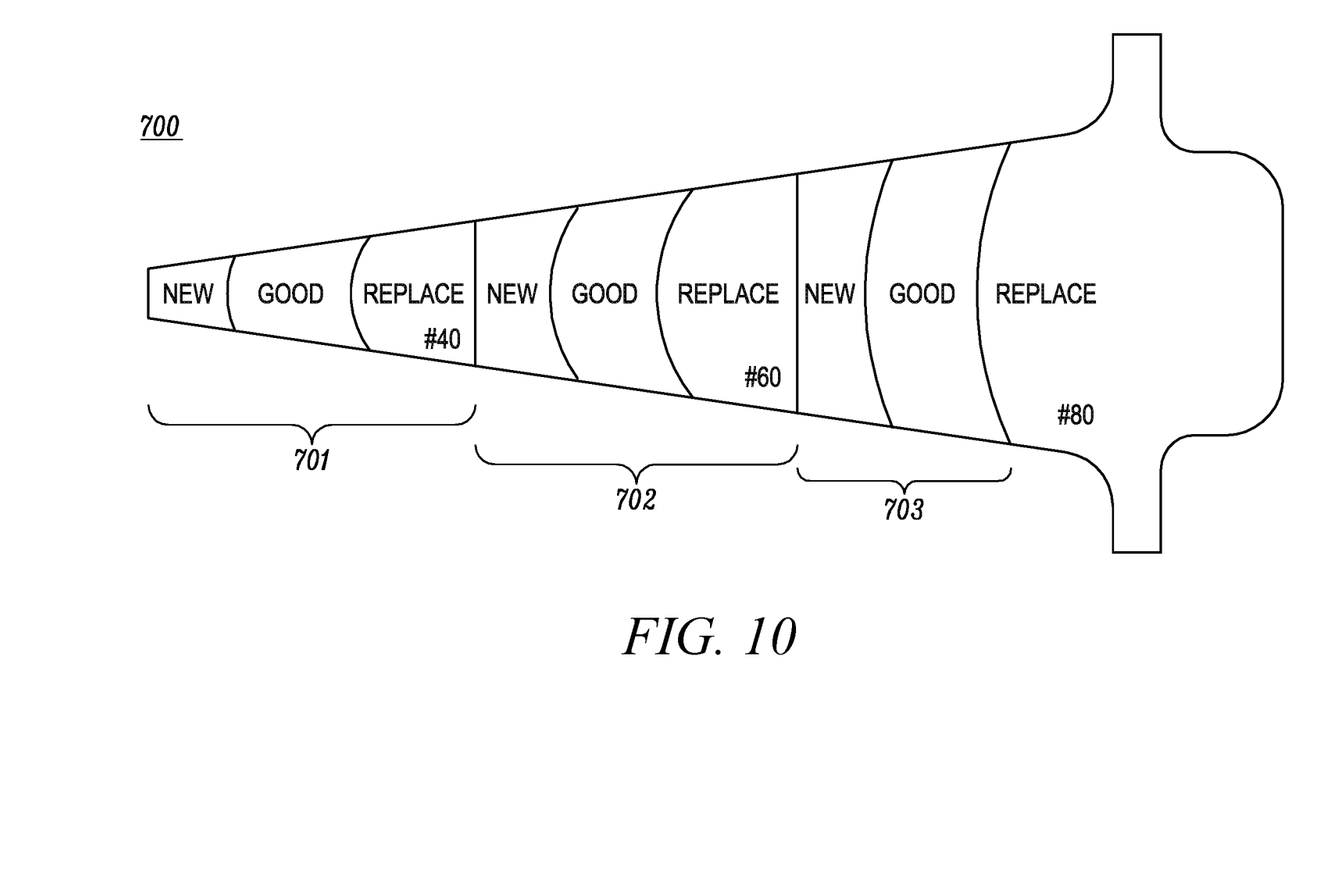
FIG. 10 is a top view of a roller chain wear gauge.

FIG. 10 illustrates a roller chain wear gauge 700. Roller chain wear gauge 700 includes a plurality of consecutive elongated structures, 701, 702, and 703. Each of the elongated structures 701, 702, and 703 is similar in form to elongated structure 200. Each of the elongated structures 701, 702, and 703 is calibrated to a different respective reference chain of a different respective chain size compared to each other of the elongated structures 701, 702, and 703. For example, elongated structure 701 may be calibrated to a No. 40 chain, elongated structure 702 may be calibrated to a No. 60 chain, and elongated structure 703 may be calibrated to a No. 80 chain. Each of elongated structures 701, 702, and 703 may include a mark or indicator indicating to which size chain they are respectively calibrated. Roller chain wear gauge 700 thus allows a user to monitor a plurality of different chain wear conditions for each of a plurality of different roller chain sizes, using a single gauge. Although roller chain wear gauge 700 is depicted as including three elongated structures 701, 702, and 703, calibrated to three respective chain sizes, in some implementations, a roller chain wear gauge could include more or less sections calibrated to more or less chain sizes. In the implementation of FIG. 10, elongated structures 701, 702, and 703 are depicted as being immediately adjacent to each other. However, in some implementations, depending upon the magnitudes of respective calibrated widths associated with each of the elongated structures included on the roller chain wear gauge, there may be gaps or overlaps between adjacent elongated structures.

Referring again to FIG. 3, handle 300 includes a grip section 301 and a finger rest section 302. Grip section 301 is a structure with a rounded proximal end tapering to a distal end at finger rest section 302. Other implementations of grip section 301 may however be formed in any suitable shape. Finger rest section 302 includes first rest 303 and second rest 304, which extend transversely to the longitudinal axis A of roller chain wear gauge 100. Finger rests 303 and 304 may also act to stop a chain from being pushed farther proximally along the chain wear gauge 100. Handle 300 includes an indicator 305 listing the chain size for which roller chain wear gauge 100 was calibrated. Handle 300 further includes an indicator 306 showing how elongated structure 200 should be inserted into a pin link.

A respective roller chain wear gauge 200 could be made and calibrated for any or every chain size, including, but not limited to, ANSI Nos. 40, 50, 60, 80, 100, 120, 140, 160, 180, 200, and 240.

Although examples herein generally discuss roller chains having rollers surrounding their bushings, a roller chain wear gauge could also be made and calibrated for rollerless roller chain. For example, roller chains of size Nos. 25 and 35 do not include rollers surrounding their bushings. A roller chain wear gauge for a rollerless roller chain (not shown) may be made and calibrated in a manner generally similar to that shown herein with respect to a roller chain wear gauge 200 for roller chains that have rollers, but such that the roller chain wear gauge's first and second side surfaces are configured to instead contact the rollerless roller chain's bushings at relevant wear/elongation states. For example, a roller chain wear gauge for a size No. 25 rollerless roller chain could be made and calibrated to have respective widths between its first and second side surfaces that equal the width of a gap between bushings of a reference size No. 25 rollerless roller chain when the reference size No. 25 rollerless roller chain has elongated (a) 0%, (b) X %, (c) Y %, and (d) Z %.

Additionally, although examples herein generally discuss roller chain wear gauges, chain wear gauges implementing disclosed principles could also be made and calibrated for other types of chain, including, but not limited to leaf chain. Leaf chain consists of link plates joined by pins. A leaf chain wear gauge (not shown) could be made and calibrated for a particular size leaf chain, such that the leaf chain wear gauge's first and second side surfaces are configured to instead contact link plates of the leaf chain at relevant wear/elongation states. For example, a leaf chain wear gauge for a given size could be made and calibrated to have respective widths between its first and second side surfaces that equal the respective widths of a gap between adjacent link plates of a reference leaf chain of the given size when the reference leaf chain of the given size has elongated (a) 0%, (b) X %, (c) Y %, and (d) Z %.

Figure 11:
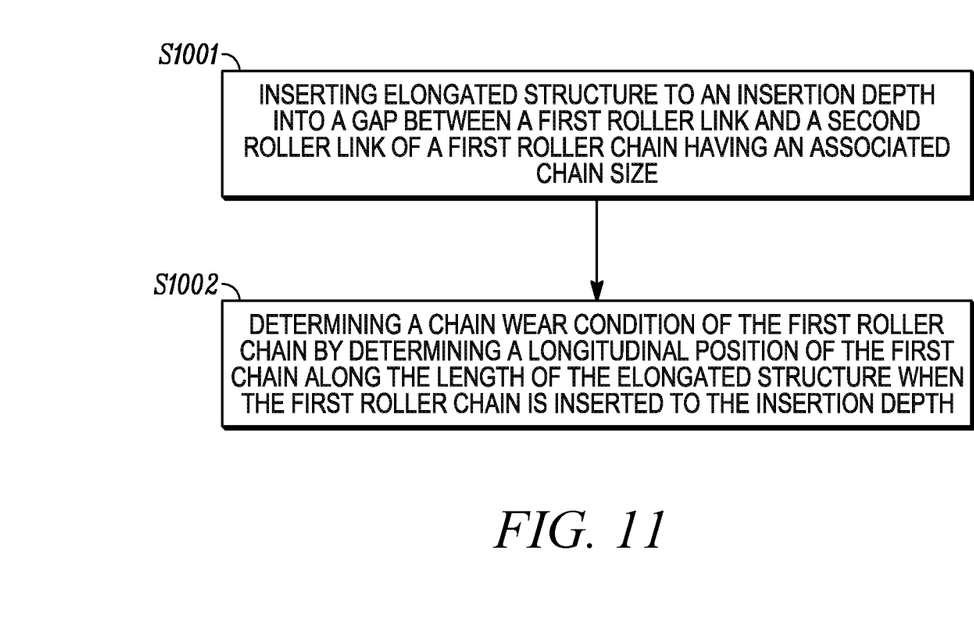
FIG. 11 is a flow chart of a method of measuring chain wear.

FIG. 11 illustrates a flow chart of a method of measuring chain wear of a roller chain wear, which includes steps S1001 and S1002, and which may be further understood with reference to FIGS. 4A, 4B, 5A, and 5B.

In step S1001, a user inserts an elongated structure to an insertion depth into a gap between a first roller link and a second roller link joined by a pin link, where the first roller link, second roller link, and pin link are links of a first roller chain having an associated chain size and whose wear is being measured. In step S1001, the first roller link may be roller link 20, the second roller link may be second roller link 30, and the pin link may be pin link 10. In step S1001, the elongated structure may be an elongated structure 200 which has been calibrated against a reference chain that is representative of the associated chain size. An associated chain size may be a standardized chain size of the roller chain being measured. In step S1001, the insertion depth may be the depth at which the first side surface 201 contacts a roller 25 of the first link 20 while the second side surface 202 contacts a roller 35 of the second roller link 30. For example, FIGS. 4A and 4B illustrate elongated structure 200 inserted into gap 40 to a first insertion depth, while FIGS. 5A and 5B illustrate elongated structure 200 inserted farther into gap 40' to a second different insertion depth. The insertion depth may be reached when the elongated structure has been inserted sufficiently far into the gap such that the roller chain being measured is under tension, and the elongated structure cannot, using a reasonable amount of force, be inserted farther into the gap.

In step S1002, the user determines a chain wear condition of the first roller chain by determining a longitudinal position of the first chain along the length of the elongated structure when the first chain is inserted to the insertion depth. In step S1002, determining the longitudinal position of the first chain along the length of the elongated structure when the first chain is inserted to the insertion depth may include comparing the longitudinal position of a portion of the pin link 10 into which the elongated structure 200 is inserted with the longitudinal position of one or more of the plurality of markings 401-404 or 501-503.

For example, the user may view the pin link 10 and elongated structure 200 from the top, as shown in FIG. 4B or 5B, and decide in which longitudinal section of elongated structure 200 the proximal edge 50 of pin link 10 is located and which indicator 501-503 is in that longitudinal section. Thus in FIG. 4B, the user would read the elongated structure 200 as indicating that the roller chain being measured is of a new wear status, and in FIG. 5B, the user would read the elongated structure 200 as indicating that the roller chain being measured is of a good wear status. In other words, in FIG. 4B, the user would note that proximal edge 50 was essentially even with mark 401, and thus would read elongated structure 200 as indicating that the roller chain is in a new condition.

As another example, the user may view the pin link 10 and elongated structure 200 from the top, as shown in FIG. 4B or 5B, and decide which of marks 401-404 is closest to the proximal edge 50 of pin link 10. Thus in FIG. 4B, the user would read the elongated structure 200 as indicating that the roller chain being measured has about 0% elongation. In FIG. 5B, in an implementation where mark 401 corresponds to 0% elongation and mark 402 corresponds to 3% elongation, the user might read the elongated structure 200 as indicating that the roller chain being measured has about 1.5% elongation, because proximal edge 50 is approximately midway between marks for 0% elongation and 3% elongation. In other words, in FIG. 5B, the user might read the elongated structure 200 as indicating that the roller chain is at about the halfway point of its useable life.

The above disclosure describes roller chain wear gauges, which can be used to measure or indicate a plurality of different chain wear conditions of a roller chain of a given chain size. The described roller chain wear gauges include a portion that tapers in width to allow for insertion between two roller links that are joined by a pin link. The described roller chain wear gauges may account for variations in the amount of allowable elongation of a roller chain of a given size for different uses of the roller chain. The described roller chain wear gauges may allow a user to know how much wear a roller chain has already sustained, or how much more wear the roller chain can tolerate before it does need to be replaced.

The above disclosure provides a variety of advantages, some examples of which include the following. Roller chain wear gauges discussed above can be used to tension a roller chain and measure chain wear or elongation using a single hand, because the elongated structure itself easily places the chain under proper tension when it is inserted. Roller chain wear gauges discussed above allow the user to read a gradient of amounts of elongation (e.g. 0%-3%) or wear statuses (e.g. good, new, or replace). Roller chain wear gauges discussed above allow a user to quickly check wear or elongation at one or more spots on a given chain. Roller chain wear gauges discussed above allow a user to determine how soon a roller chain that is in new or good condition will need to be replaced. Other benefits of the above disclosure may be apparent to one skilled in the art.

While various aspects of the disclosure have been described, the scope of the disclosure is not to be restricted except in light of the appended claims and their equivalents. Having been exposed to this disclosure, one skilled in the art may become aware of other aspects and implementations within the scope of this disclosure. Moreover, the advantages expressly described herein are not necessarily the only advantages of aspects of the disclosure, and it is not necessarily expected that every aspect of the disclosure will achieve all of the advantages expressly described.

What is claimed is:

1. A device to measure chain wear, the device comprising:
an elongated structure configured to be inserted into a gap between two roller links of a chain joined by a pin link of the chain, the chain having an associated chain size, the elongated structure comprising:
a first side surface,
a second side surface,
a length extending along a longitudinal axis of the elongated structure, and
a plurality of widths located along the length and defined by and between the first and second side surfaces,
wherein the first side surface extends at an angle relative to the longitudinal axis such that the plurality of widths continuously tapers over the length, and
wherein the plurality of widths comprises a first width calibrated to correspond to a gap between two links of a reference chain with a first amount of elongation and a second width calibrated to correspond to a gap between the two links of the reference chain with a second amount of elongation, the reference chain being representative of the associated chain size, the two links of the reference chain being two roller links of the reference chain joined by a pin link of the reference chain.

2. The device of claim 1, wherein the second side surface extends at an angle relative to the longitudinal axis such that the first and second side surfaces are symmetrically positioned about the longitudinal axis with respect to each other.

3. The device of claim 1, wherein the elongated structure further comprises a plurality of markings each located at a different respective longitudinal position along the length, the respective longitudinal position of each of the plurality of markings calibrated based upon the reference chain to indicate a different respective chain wear condition for the associated chain size.

4. The device of claim 3, wherein:
the plurality of markings comprises a first mark associated with the first width and a second mark associated with the second width,
the first and second marks divide the elongated structure into consecutive first, second, and third longitudinal sections, and
each of the longitudinal sections represents a different respective range of amounts of elongation of the associated chain size.

5. The device of claim 4, wherein:
the first longitudinal section represents less than 0% elongation of the associated chain size, the second longitudinal section represents greater than 0% to less than 3% elongation of the associated chain size, and the third longitudinal section represents greater than 3% elongation of the associated chain size.

6. The device of claim 4, wherein:

the first longitudinal section comprises an indicator configured to indicate that a measured chain of the associated chain size is of a new wear status, the second longitudinal section comprises an indicator configured to indicate that a measured chain of the associated size is of a good wear status, and the third longitudinal section comprises an indicator configured to indicate that a measured chain of the associated chain size is of a wear status at which the measured chain should be replaced due to wear.

7. The device of claim 1, wherein:

the first width substantially equals a width of the gap between the two links of the reference chain with the first amount of elongation, and the second width substantially equals a width of the gap between the two links of the reference chain with the second amount of elongation.

8. A device to measure chain wear, the device comprising:

an elongated structure configured to be inserted into a gap between two roller links of a chain joined by a pin link of the chain, the chain having an associated chain size, the elongated structure comprising:

a first side surface, a second side surface, a length extending along a longitudinal axis of the elongated structure, a plurality of widths located along the length and defined by and between the first and second side surfaces, and a plurality of markings each located at a different respective longitudinal position along the length, wherein the plurality of widths comprises a first width calibrated to substantially equal a width of a gap between two links of a reference chain with a first amount of elongation and a second width different from the first width and calibrated to substantially equal a width of a gap between the two links of the reference chain with a second amount of elongation, the reference chain being representative of the associated chain size, the two links of the reference chain being two roller links of the reference chain joined by a pin link of the reference chain, and wherein the respective longitudinal position of each of the plurality of markings is calibrated based upon the reference chain to correspond to a different respective chain wear condition of the associated chain size.

9. The device of claim 8, wherein:

the second width is greater than the first width, and the plurality of markings comprises a mark associated with the second width.

10. The device of claim 9, wherein the plurality of markings further comprises an indicator located proximal to the mark associated with the second width and configured to indicate that a measured chain of the associated chain size is of a wear status at which the measured chain should be replaced due to wear.

11. The device of claim 8, wherein:

the plurality of widths further comprises a third width calibrated to correspond to a width of a gap between the two links of the reference chain with a third amount of elongation, the third width is greater than the first width and less than the second width, and the plurality of markings comprises a mark associated with the second width and a mark associated with the third width.

12. The device of claim 11, wherein the plurality of markings comprises an indicator that is located distal to the mark associated with the third width and configured to indicate that a measured chain of the associated chain size is of a new wear status.

13. The device of claim 11, wherein the plurality of markings comprises an indicator that is located between the mark associated with the second width and the mark associated with the third width and configured to indicate that a measured chain of the associated chain size is of a good wear status.

14. The device of claim 11, wherein the second amount is a 3% elongation of the reference chain and the first amount is a 0% elongation of the reference chain.

15. The device of claim 11, wherein the plurality of widths is configured to provide the elongated structure with a shape that continuously tapers over the length.

16. A method of measuring chain wear, the method comprising:

inserting an elongated structure to an insertion depth into a gap between a first roller link of a first chain joined to a second roller link of the first chain by a pin link of the first chain, wherein the elongated structure comprises:

a first side surface, a second side surface, a length extending along a longitudinal axis of the elongated structure, and a plurality of widths located along the length and defined by and between the first and second side surfaces, wherein the first side surface extends at an angle relative to the longitudinal axis such that the plurality of widths continuously tapers over the length, and wherein at the insertion depth the first side surface contacts a roller of the first roller link of the first chain while the second side surface contacts a roller of the second roller link of the first chain; and determining a chain wear condition of the first chain by determining a longitudinal position of the first chain along the length of the elongated structure when the first chain is inserted to the insertion depth.

17. The method of claim 16, wherein the first chain has an associated chain size, and the plurality of widths comprises a first width that substantially equals a width of a gap between two links of a reference chain with a first amount of elongation and a different second width that substantially equals a width of the gap between the two links of the reference chain with the second amount of elongation, the reference chain being representative of the associated chain size, the two links of the reference chain being two roller links of the reference chain joined by a pin link of the reference chain.

18. The method of claim 16, wherein the first chain has an associated chain size, and the elongated structure further comprises a plurality of markings located along the length and each calibrated based upon a reference chain representative of the associated chain size to indicate a different respective chain wear condition of the associated chain size.

19. The method of claim 18, wherein the determining of the chain wear condition of the first chain comprises, when the first chain is inserted to the insertion depth, comparing the longitudinal position of the first chain along the length with a respective longitudinal position of one of the plurality of markings along the length.

20. The method of claim 19, wherein the determining of the chain wear condition of the first chain comprises reading the chain wear condition from the plurality of the markings.

* * * * *